(12) United States Patent
Ward et al.

(10) Patent No.: US 10,007,469 B2
(45) Date of Patent: Jun. 26, 2018

(54) VIRTUAL PAGE GENERATION MECHANISM

(71) Applicants: David Ward, Broomfield, CO (US); John Thomas Varga, Longmont, CO (US); Charles D. Johnson, Boulder, CO (US)

(72) Inventors: David Ward, Broomfield, CO (US); John Thomas Varga, Longmont, CO (US); Charles D. Johnson, Boulder, CO (US)

(73) Assignee: Ricoh Company, Ltd., Tokyo (JP)

( * ) Notice: Subject to any disclaimer, the term of this patent is extended or adjusted under 35 U.S.C. 154(b) by 917 days.

(21) Appl. No.: 13/849,752

(22) Filed: Mar. 25, 2013

(65) Prior Publication Data

US 2014/0285833 A1 Sep. 25, 2014

(51) Int. Cl.
*G06F 3/12* (2006.01)
*G06K 15/00* (2006.01)

(52) U.S. Cl.
CPC ............ *G06F 3/1204* (2013.01); *G06F 3/125* (2013.01); *G06F 3/1208* (2013.01); *G06F 3/1288* (2013.01)

(58) Field of Classification Search
CPC .................................................. G06K 15/181
See application file for complete search history.

(56) References Cited

U.S. PATENT DOCUMENTS

| 8,223,388 | B2 | 7/2012 | Nakao et al. | |
| 2009/0002764 | A1 | 1/2009 | Atkins | |
| 2009/0303513 | A1* | 12/2009 | Wardell et al. | 358/1.13 |
| 2010/0073707 | A1 | 3/2010 | Ferlitsch | |
| 2011/0122433 | A1 | 5/2011 | Klassen | |
| 2011/0292436 | A1 | 12/2011 | Puigardeu et al. | |
| 2013/0010325 | A1* | 1/2013 | Varga et al. | 358/1.15 |

* cited by examiner

*Primary Examiner* — Dov Popovici
(74) *Attorney, Agent, or Firm* — Jaffery Watson Mendonsa & Hamilton LLC

(57) ABSTRACT

A mechanism is described to facilitate virtual page generation according to one embodiment. A method of embodiments, as described herein, includes performing a virtual rasterization of print job data to generate a virtual sheet, fitting the virtual sheet to a job sheet, and printing the job sheet to a physical medium.

18 Claims, 5 Drawing Sheets

VIRTUAL PAGE GENERATION MECHANISM

FIELD OF THE INVENTION

This invention relates generally to the field of printing systems. More particularly, the invention relates to image processing in a printing system.

BACKGROUND

In a variety of document presentation systems such as printing systems, it is common to rasterize data to generate a bitmap representation of each sheetside image of the document by processing a sequence of data objects. The data objects are typically included in a print job that is defined in a page description language (PDL) or other suitable encoding that are, at some point prior to writing to a bitmap, represented as regions of rectangles of pixels. Typically, the sheetside image is generated into a bitmap memory as a two dimensional matrix of pixels representing the intended document sheetside image, and subsequently compressed. These sheetside images are often saved to enable reuse during printing of a job to a physical medium (e.g., paper).

The placement of the rasterized images on the medium (e.g., job media) is typically specified in the print job. For instance, in a continuous forms printer, the job media is the media characteristics (e.g., size, weight, color, etc.) requested in a job ticket. However, the physical media may not be the same as the job media, particularly on a continuous forms printer.

Accordingly, a mechanism to control placement of rasterized images on physical media is desired.

SUMMARY

In one embodiment, a method is disclosed. The method includes performing rasterization of print job data to generate a virtual sheet and printing the virtual sheet to a physical medium.

In another embodiment, a control unit is disclosed. The control includes a rasterizer to perform rasterization of print job data to generate a virtual sheet, fit the virtual sheet to a job sheet, and a print engine to print the job sheet to a physical medium.

BRIEF DESCRIPTION OF THE DRAWINGS

A better understanding of the present invention can be obtained from the following detailed description in conjunction with the following drawings, in which.

DETAILED DESCRIPTION

A mechanism to control placement, rotation, and scaling of rasterized images on a physical medium is described. In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
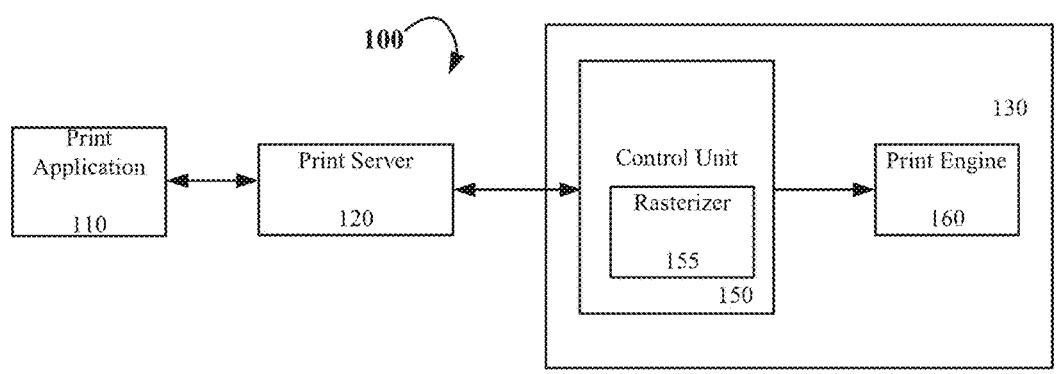
FIG. 1 illustrates one embodiment of a printing system.

FIG. 1 illustrates one embodiment of a printing system 100. Printing system 100 includes a print application 110, a server 120 and printer 130. Print application 110 makes a request for the printing of a document. In one embodiment, print application 110 provides Advanced function printing (AFP) files for printing to print server 120. In a further embodiment, the print application provides PostScript (PS) and Portable Document Format (PDF) data streams to print server 120.

Printer 130 includes a control unit 150 and a print engine 160. According to one embodiment, control unit 150 performs processing functions for printer 130. In a further embodiment, control unit 150 processes and renders objects received from print server 120 and provides sheet maps for printing to print engine 160. Moreover, control unit 150 may include processing logic that may include hardware (e.g., circuitry, dedicated logic, programmable logic, microcode, etc.), software (such as instructions run on a processing device), or a combination thereof.

Control unit 150 includes a rasterizer 155 implemented to process pages received at control unit 150 by performing a raster image process (RIP) to convert a page described in a vector graphics format (e.g., shapes) into a raster image (e.g., pixels). The RIP performed by rasterizer 155 produces a side map for each page of a print job that is ultimately forwarded to print engine 160 for printing. In one embodiment, printer 130 is a continuous form printer. However, other embodiments may feature printer 130 as a different type.

Figure 2:
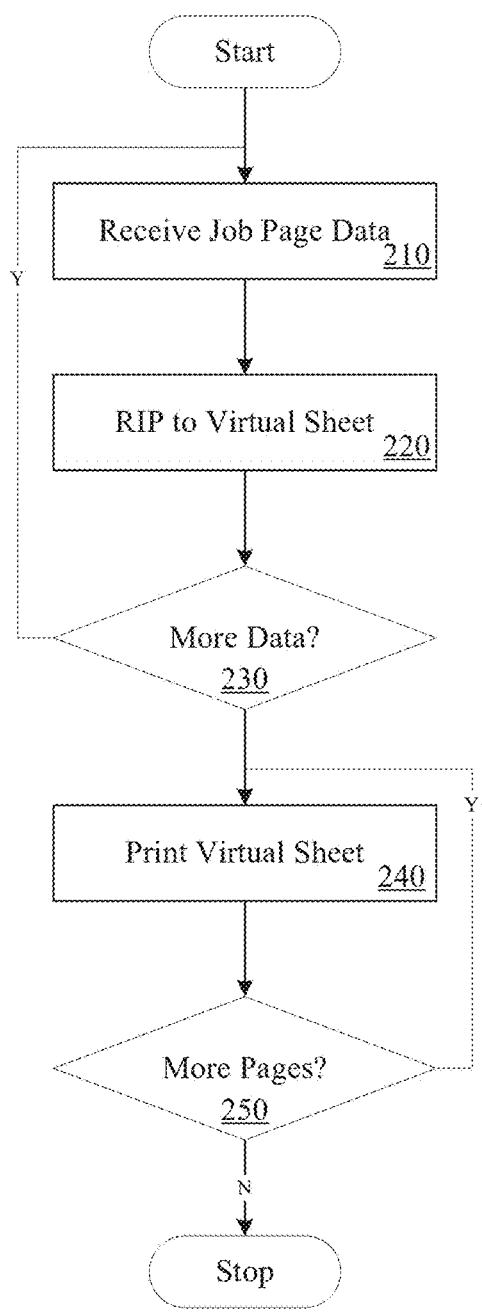
FIG. 2 is a flow diagram illustrating one embodiment of a process for controlling the placement of rasterized images on physical media.

According to one embodiment, job pages are rasterized to a virtual page (or sheet) in order to control placement of images on the physical medium. In such an embodiment, generation of a virtual sheet separates the print job specifications from the paper in printer 130. FIG. 2 is a flow diagram illustrating one embodiment for processing a print job by implementing a virtual sheet mechanism to control the placement of rasterized images on physical media.

At processing block 210, a first (or next) page of print job data is received at rasterizer 155. At processing block 220, rasterizer 155 performs a virtual RIP process on the data to generate a virtual sheet. According to one embodiment, a virtual sheet is logically produced based on job media requested in a job ticket corresponding to the print job. Thus, cell dimensions (e.g., size of media for an n-Up (e.g., 2 or more pages on a single sheet) job) are determined based on the job media not the physical media. In another embodiment, the given cell dimensions along with gutter and outer margins determine the size of the virtual sheet, which must be fit onto the job sheet and then applied to the physical media.

In a further embodiment, the pages of a job are scaled or clipped to the cell dimension, which in turn is specified in the job ticket or is determined by the size of the requested job media. In still another embodiment, the virtual sheet may be constructed independent of the physical or job sheet specifications. However in an alternative embodiment, the virtual sheet may be constructed based, and/or dependent, on information from the job sheet specifications.

Figure 3A:
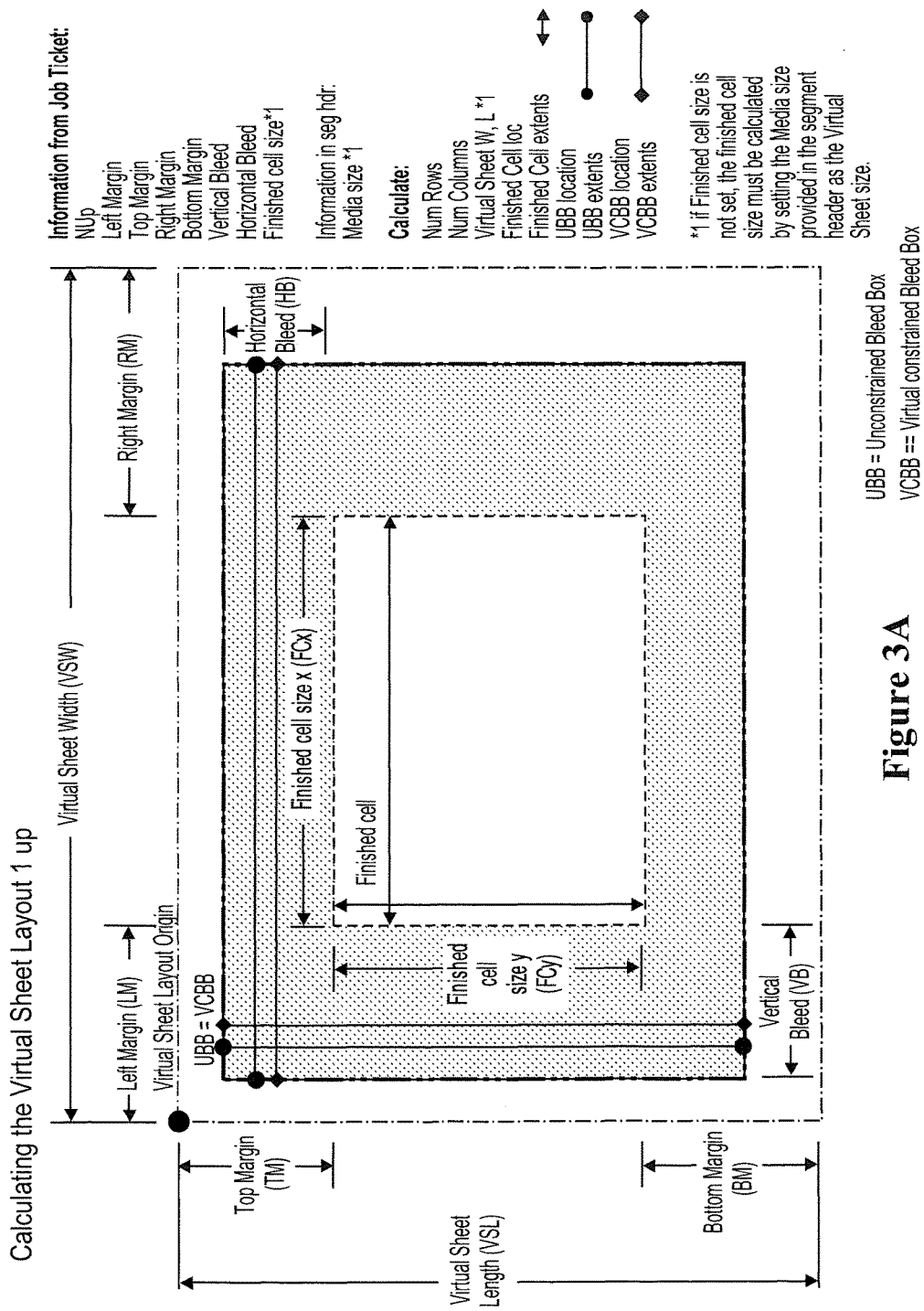
FIGS. 3A and 3B illustrate embodiments of a virtual sheet.
Figure 3B:
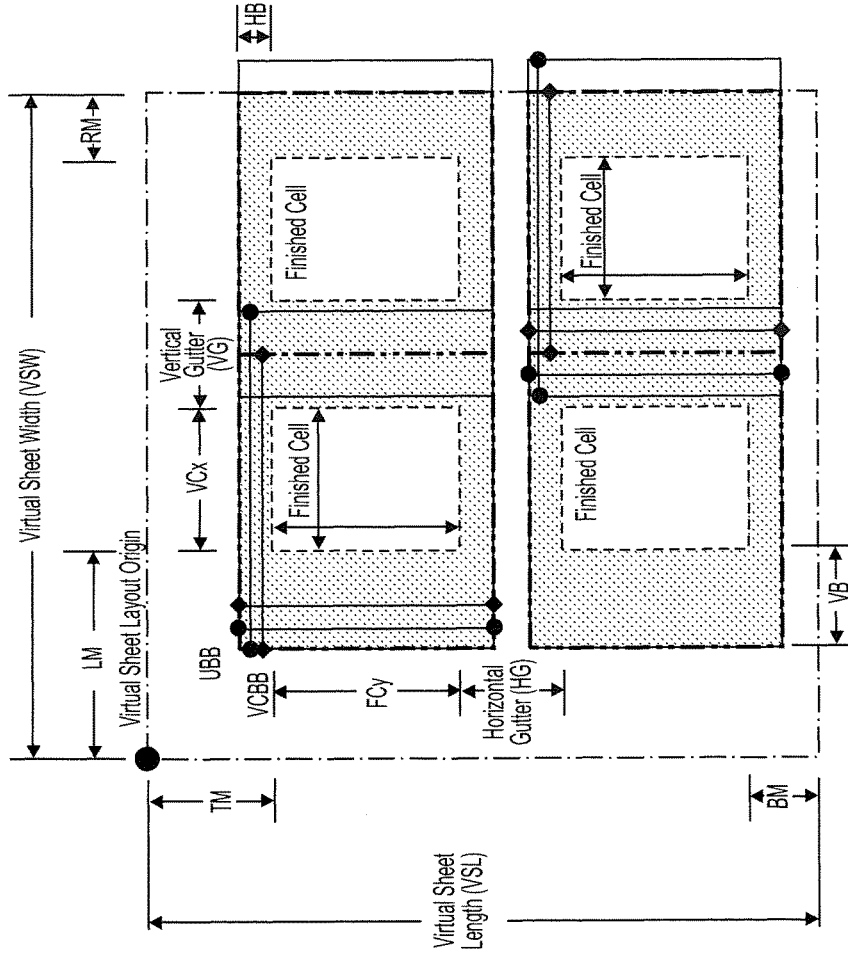

FIGS. 3A and 3B illustrate embodiments of a calculated virtual sheet produced according to processing block 210. FIG. 3A shows a virtual sheet generated for a 1-Up embodiment, while FIG. 3B shows a virtual sheet generated for a 4-Up embodiment.

At decision block 230, a determination is made as to whether there is additional data to process. If so, control is returned to processing block 210 where the next page of print job data is received. Otherwise, the first (or next) virtual sheet is ripped according to the job sheet and then placed on the physical sheet for printing, processing block 240. In one embodiment, the virtual sheet is placed on the physical sheet (e.g., centered, top, left, etc.) based on user requirements.

In a further embodiment, the virtual sheet may be auto-rotated to a best fit possible on the physical medium if the job medium does not match the physical media. In yet another embodiment, control unit 150 may stop print engine 160 and alert an operator whenever there is a mismatch between the job media and the physical media. At decision block 250, determination is made as to whether there are additional virtual sheets to apply to physical media. If so, control is returned to processing block 240 where the next virtual sheet is printed. Otherwise, the process has completed for the print job.

The above-described mechanism provides for the application of color properties of, and the placement and layout of images (e.g., placement center, bottom left, etc, shift, scale, rotate) on physical roll sheet media.

Figure 4:
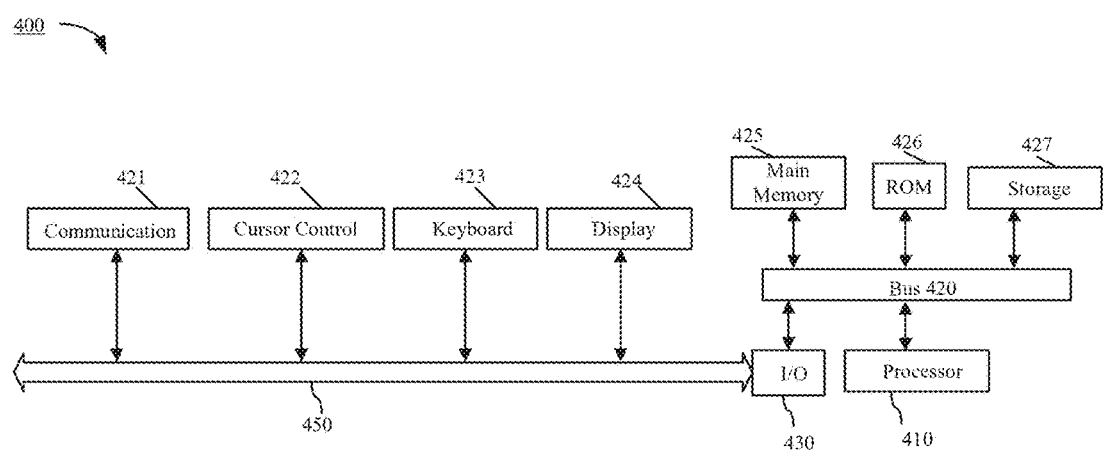
FIG. 4 illustrates one embodiment of a computer system.

FIG. 4 illustrates a computer system 400 on which print server 120 and printer 130 described with respect to FIG. 1 may be implemented. Computer system 400 includes a system bus 420 for communicating information, and a processor 410 coupled to bus 420 for processing information. According to one embodiment, processor 410 is implemented using one of multitudes of microprocessors. Nevertheless one of ordinary skill in the art will appreciate that other processors may be used.

Computer system 400 further comprises a random access memory (RAM) or other dynamic storage device 425 (referred to herein as main memory), coupled to bus 420 for storing information and instructions to be executed by processor 410. Main memory 425 also may be used for storing temporary variables or other intermediate information during execution of instructions by processor 410. Computer system 400 also may include a read only memory (ROM) and or other static storage device 426 coupled to bus 420 for storing static information and instructions used by processor 410.

A data storage device 427 such as a magnetic disk or optical disc and its corresponding drive may also be coupled to computer system 400 for storing information and instructions. Computer system 400 can also be coupled to a second I/O bus 450 via an I/O interface 430. A plurality of I/O devices may be coupled to I/O bus 450, including a display device 424, an input device (e.g., an alphanumeric input device 423 and or a cursor control device 422). The communication device 421 is for accessing other computers (servers or clients) via an external data network, for example. The communication device 421 may comprise a modem, a network interface card, or other well-known interface device, such as those used for coupling to Ethernet, token ring, or other types of networks.

Embodiments of the invention may include various steps as set forth above. The steps may be embodied in machine-executable instructions. The instructions can be used to cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Throughout the foregoing description, for the purposes of explanation, numerous specific details were set forth in order to provide a thorough understanding of the invention. It will be apparent, however, to one skilled in the art that the invention may be practiced without some of these specific details. Accordingly, the scope and spirit of the invention should be judged in terms of the claims which follow.

What is claimed is:

1. A non-transitory computer-readable medium including instructions, which when executed by a processor, performs operations comprising:
   performing a virtual rasterization on print job data to generate a virtual sheet independent of physical page specifications;
   mapping the virtual sheet to a job sheet; and
   performing rasterization of the virtual sheet to print to a physical medium according to the job sheet.

2. The computer-readable medium of claim 1, wherein generation of the virtual sheet is generated based on job media corresponding to the print job data.

3. The computer-readable medium of claim 2, wherein the job media is specified in a job ticket corresponding to the print job.

4. The computer-readable medium of claim 3, wherein cell dimensions for the virtual sheet are determined based on the job media.

5. The computer-readable medium of claim 3, wherein the physical medium is constructed based on information from physical page specifications and the virtual sheet.

6. The computer-readable medium of claim 2, wherein the virtual sheet is auto-rotated to a best fit possible on the physical medium if the job media does not match the physical medium.

7. The computer-readable medium of claim 2, wherein a printing process is stopped if the job media does not match the physical medium.

8. A control unit, comprising:
   a rasterizer to perform a virtual rasterization on print job data to generate a virtual sheet independent of physical page specifications, map the virtual sheet to a job sheet and perform rasterization of the virtual sheet to print to a physical medium according to the job sheet; and
   a print engine to print job sheet data to the physical medium.

9. The control unit of claim 8, wherein generation of the virtual sheet is generated based on job media corresponding to a print job.

10. The control unit of claim 9, wherein the job media is specified in a job ticket corresponding to the print job.

11. The control unit of claim 10, wherein cell dimensions for the virtual sheet are determined based on the job media.

12. The control unit of claim 10, wherein the virtual sheet is constructed based on information from physical page specifications and the virtual sheet.

13. The control unit of claim 9, wherein the virtual sheet is auto-rotated to a best fit possible on the physical medium if the job media does not match the physical medium.

14. The control unit of claim 9, wherein a printing process is stopped if the job media does not match the physical medium.

15. A method comprising:
   performing a virtual rasterization on print job data to generate a virtual sheet independent of physical page specifications;
   mapping the virtual sheet to a job sheet; and
   performing rasterization of the virtual sheet to print to a physical medium according to the job sheet.

16. The method of claim 15, wherein generation of the virtual sheet is generated based on specified page size and any internal gutter or outer margins.

17. The method of claim 16, wherein the job media is specified in a job ticket corresponding to the print job.

18. The method of claim 16, wherein cell dimensions for the virtual sheet are determined based on the job media.

* * * * *